(12) United States Patent
Saint-Pierre

(10) Patent No.: US 7,990,127 B2
(45) Date of Patent: Aug. 2, 2011

(54) METHOD AND APPARATUS FOR AC TO DC POWER CONVERSION WITH REDUCED HARMONIC CURRENT

(75) Inventor: Roland Saint-Pierre, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 540 days.

(21) Appl. No.: 12/049,098

(22) Filed: Mar. 14, 2008

(65) Prior Publication Data

US 2009/0231889 A1  Sep. 17, 2009

(51) Int. Cl.
*G05F 1/565* (2006.01)
*H02M 1/12* (2006.01)

(52) U.S. Cl. ............... 323/285; 323/288; 363/44

(58) Field of Classification Search .......... 323/282, 323/285, 286, 288; 363/39, 89, 44

See application file for complete search history.

(56) References Cited

U.S. PATENT DOCUMENTS

| | | | | |
|---|---|---|---|---|
| 4,357,572 A | * | 11/1982 | Andersen et al. | 323/286 |
| 4,816,982 A | * | 3/1989 | Severinsky | 363/44 |
| 5,479,090 A | * | 12/1995 | Schultz | 323/284 |
| 5,804,950 A | | 9/1998 | Hwang et al. | |
| 6,178,104 B1 | * | 1/2001 | Choi | 363/89 |
| 6,191,676 B1 | * | 2/2001 | Gabor | 336/160 |
| 6,448,744 B1 | * | 9/2002 | Malik et al. | 323/207 |
| 6,900,995 B2 | * | 5/2005 | Muegge et al. | 363/21.05 |
| 6,977,824 B1 | | 12/2005 | Yang et al. | |
| 7,016,204 B2 | | 3/2006 | Yang et al. | |
| 7,054,170 B2 | | 5/2006 | Yang et al. | |

(Continued)

FOREIGN PATENT DOCUMENTS

WO   WO 2005/043732 A1   5/2005

OTHER PUBLICATIONS

Tang, W.; Lee, F.C.; Ridley, R.B.; Cohen, I.; "Charge control: modeling, analysis, and design," Power Electronics, IEEE Transactions on, vol. 8, No. 4, pp. 396-403, Oct. 1993; Retrieved on Oct. 6, 2010. doi: 10.1109/63.261009 URL: http://ieeexplore.ieee.org/stamp/stamp.jsp?tp=&arnumber=261009&isnumber=6596.* U.S. Appl. No. 12/477,010, filed Jun. 2, 2009, Saint-Pierre.
U.S. Appl. No. 12/477,052, filed Jun. 2, 2009, Liu et al.
U.S. Appl. No. 12/477,058, filed Jun. 2, 2009, Kung et al.

*Primary Examiner* — Adolf Berhane
*Assistant Examiner* — Fred E Finch, III
(74) *Attorney, Agent, or Firm* — Blakely Sokoloff Taylor & Zafman LLP

(57) ABSTRACT

A method and apparatus are disclosed for controlling a buck converter. In one aspect, an integrator is coupled to receive a current sense signal representative of a current in a switch of the buck converter and to integrate the current sense signal to produce a first input signal. A ramp generator is coupled to receive an oscillating signal having a same switching period as the switch, and to generate a piecewise linear ramp signal in response to the oscillating signal. The piecewise linear ramp signal has a delay segment of substantially zero slope followed by a plurality of segments having finite linear slopes within the switching period of the switch. A multiplier multiplies the piecewise linear ramp signal to produce a second input signal and a drive signal generator is coupled to receive a third input signal generated in response to the first and the second input signals to produce a drive signal to be coupled to control the switch to substantially regulate an output voltage of the buck converter.

20 Claims, 5 Drawing Sheets

U.S. PATENT DOCUMENTS

| | | |
|---|---|---|
| 7,061,225 B2 | 6/2006 | Yang et al. |
| 7,061,780 B2 | 6/2006 | Yang et al. |
| 7,259,972 B2 | 8/2007 | Yang |
| 7,345,464 B2 * | 3/2008 | Steele ............................ 323/288 |
| 7,352,595 B2 | 4/2008 | Yang et al. |
| 7,391,631 B2 * | 6/2008 | Shimada ......................... 363/89 |
| RE40,656 E | 3/2009 | Yang et al. |
| 7,714,554 B2 * | 5/2010 | Jacques et al. ................ 323/282 |
| 2008/0192514 A1 | 8/2008 | Zhou et al. |

\* cited by examiner

METHOD AND APPARATUS FOR AC TO DC POWER CONVERSION WITH REDUCED HARMONIC CURRENT

BACKGROUND

1. Field of the Disclosure

The present invention relates generally to power supplies and, more specifically, the present invention relates to alternating current (AC) to direct current (DC) power supplies.

2. Background Information

A current having a frequency that is a multiple of the fundamental frequency of an AC power line is a harmonic current. Harmonic currents are a burden to the power generation and distribution system. Hence, regulatory agencies impose restrictions on the harmonic current that power supplies draw from the power line.

It is well known that switching power supplies can be controlled so that the input current is directly proportional to the input voltage, making the power supply appear as a resistor to the power source. These techniques have been successful in reducing the harmonic current at the input of switching power supplies that use many different topologies, such as for example the boost, buck-boost, flyback, and single ended primary inductor converter ("SEPIC") topologies that are known in the art. In each of these topologies, the technique of making the power supply appear as a resistor to the power source is sufficient to allow an AC-to-DC power supply to meet the requirement of low harmonic current at the input.

The same technique that makes a power supply appear as a resistor to a power source, however, does not meet the requirement for low harmonic current when it is applied to a buck switching converter topology. Whereas other converter topologies can take current from the input during an entire cycle of the AC input voltage, the buck converter takes current from the input only when the input voltage is greater than the output voltage. Therefore, the power supply appears as a resistor only during a portion of the cycle of the AC input voltage, and appears as an open circuit otherwise. As a result, the AC input has higher than acceptable harmonic current.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Examples of a circuit and method for reducing the harmonic current at the input of an AC-to-DC power supply using a switching power converter with a novel controller are disclosed herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. Furthermore, the particular features, structures or characteristics may be combined in any suitable manner in one or more embodiments.

Many AC-DC power supplies are required to have an AC input current with low harmonic content. Simple low-cost circuits that change an AC voltage to a DC voltage usually give unacceptable results because their AC input current contains large amplitudes at frequencies that are multiples of the fundamental frequency of the AC power line.

As will be described, in one example of the present invention, a method and apparatus disclosed here for explanation purposes uses an integral of a switch current and a delayed piecewise linear ramp signal that has special characteristics to allow an AC-to-DC power supply using a buck converter topology to meet the requirements for low harmonic current at its input. In another example, the delayed piecewise linear ramp may also control a flyback converter, or any other suitable power converter topology, to meet requirements of reduced harmonic current at the input of an AC-to-DC power supply in accordance with the teachings of the present invention.

Figure 1:
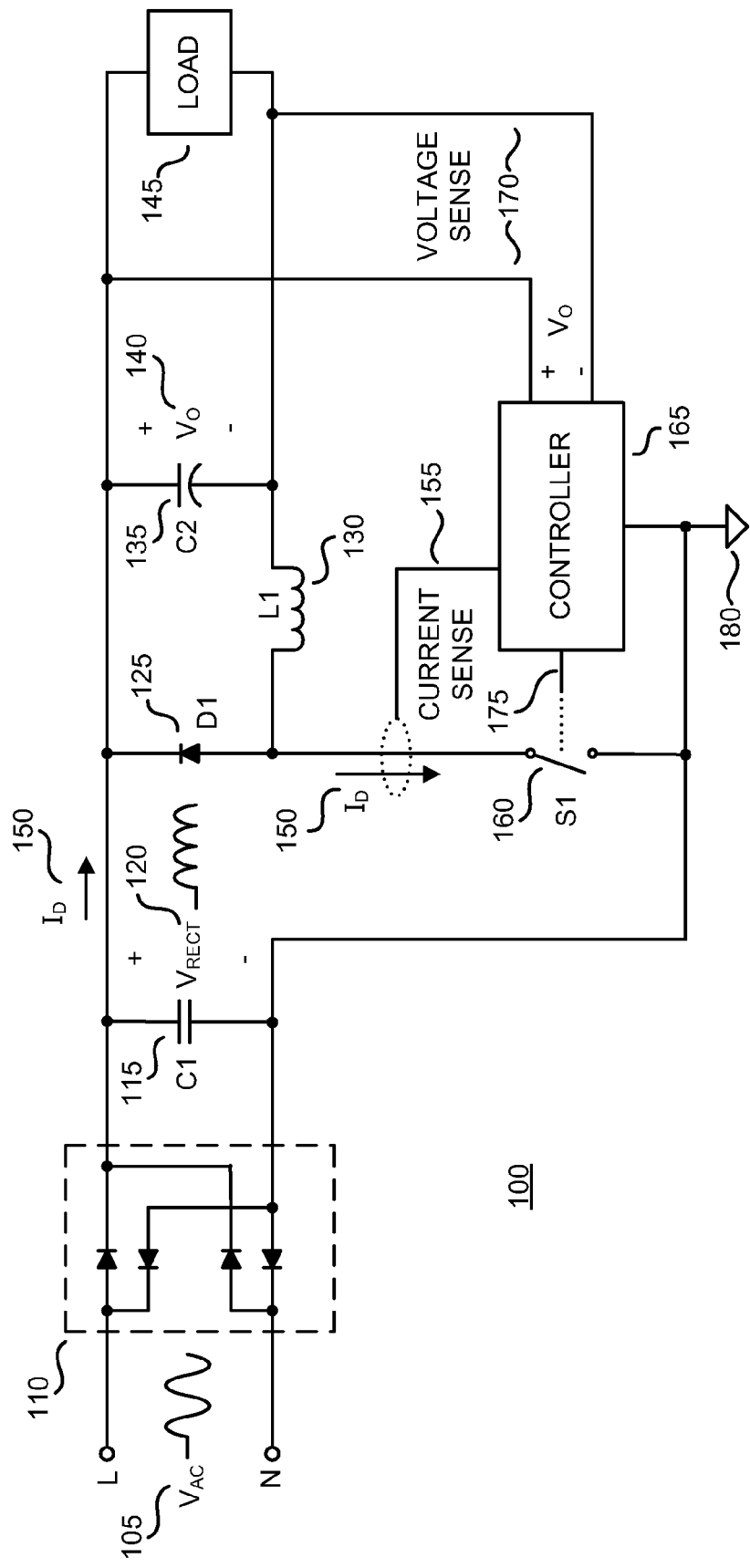
FIG. 1 shows one example of an AC-to-DC power supply that uses one example of the present invention to reduce harmonic current drawn from an AC power source in accordance with the teachings of the present invention.

Accordingly, FIG. 1 is functional block diagram showing an example of an AC-to-DC power supply 100 that controls a switching converter to meet the requirements of low harmonic current at an AC input. A rectifier 110 receives an AC input 105 with a voltage $V_{AC}$ to produce a rectified DC voltage $V_{RECT}$ 120 on a small filter capacitor C1 115. In the example of FIG. 1, the rectifier 110 is a full wave bridge rectifier. The rectified DC voltage $V_{RECT}$ 120 is measured with respect to a common input return 180. In the example, capacitor C1 115 is large enough to provide a reservoir for a high frequency switching current or switch current $I_D$ 150, but small enough to allow the rectified DC voltage $V_{RECT}$ 120 to go substantially to zero twice during every cycle of the voltage $V_{AC}$ at the AC input 105.

Those skilled in the art will recognize an example configuration of a diode D1 125, an inductor L1 130, a capacitor C2 135, a switch S1 160, and a load 145 in FIG. 1 to be a buck converter that has a low-side switch. A low-side switch has one end of the switch at an electrical potential that is the same electrical potential as the input return 180. The input return 180 is the negative DC terminal of the rectifier 110. In the example of FIG. 1, the buck converter with a low-side switch receives the rectified DC voltage $V_{RECT}$ 120 at its input.

In an alternate example, a buck converter with a high-side switch instead of a low-side switch may receive the rectified DC voltage $V_{RECT}$ 120 at its input. A high-side switch has one end of the switch at an electrical potential that is the same electrical potential as a positive DC terminal of the rectifier 110.

In other examples, well-known configurations of power converters that have transformer isolation can also benefit from teachings of embodiments of the invention. One example of a buck converter that has transformer isolation is the single-switch forward converter.

Buck converter configurations that have transformer isolation and multiple switches can benefit from teachings of the invention by sensing current in multiple switches. Examples of buck converter configurations that use transformer isolation with multiple switches are the two-switch forward converter, the push-pull buck converter, the half bridge buck converter, and the full-bridge buck converter.

According to various examples of the invention, different configurations of power converters receive the rectified DC voltage $V_{RECT}$ at their inputs. It is appreciated that the function of diode D1 125 may sometimes be realized with a switch, and that S1 160, whether low-side or high-side, whether single or one of a plurality of switches, is a switch that conducts current either to or from the rectified DC voltage $V_{RECT}$ 120.

The buck converter with a low-side switch in the example of FIG. 1 produces an output voltage $V_O$ 140 on the output capacitor C2 135 and the load 145. In the example, a controller 165 senses the output voltage $V_O$ 140 on the output capacitor C2 135 and the load 145 with a pair of voltage sense terminals 170. The controller 165 also senses the switch current $I_D$ 150 in the switch S1 160 as a sensed current signal 155.

Any of the many known ways to sense current may be used to produce the sensed current signal 155. For example, the switch current $I_D$ 150 may be sensed with a current transformer to produce the sensed current signal 155 as a voltage or a current. In another example, the switch current $I_D$ 150 may be sensed as a voltage across a discrete resistor. In yet another example, the switch current $I_D$ 150 may be sensed as a voltage between the drain and the source of a metal oxide semiconductor field effect transistor (MOSFET) that is used for the switch S1 160. In one example, controller 165 and switch S1 160 are on a same integrated circuit.

In the example of FIG. 1, the controller 165 produces a drive signal 175 that controls or periodically opens and closes switch S1 160 to substantially regulate the output voltage $V_O$ 140 while maintaining low harmonic current at the AC input 105.

Figure 2:
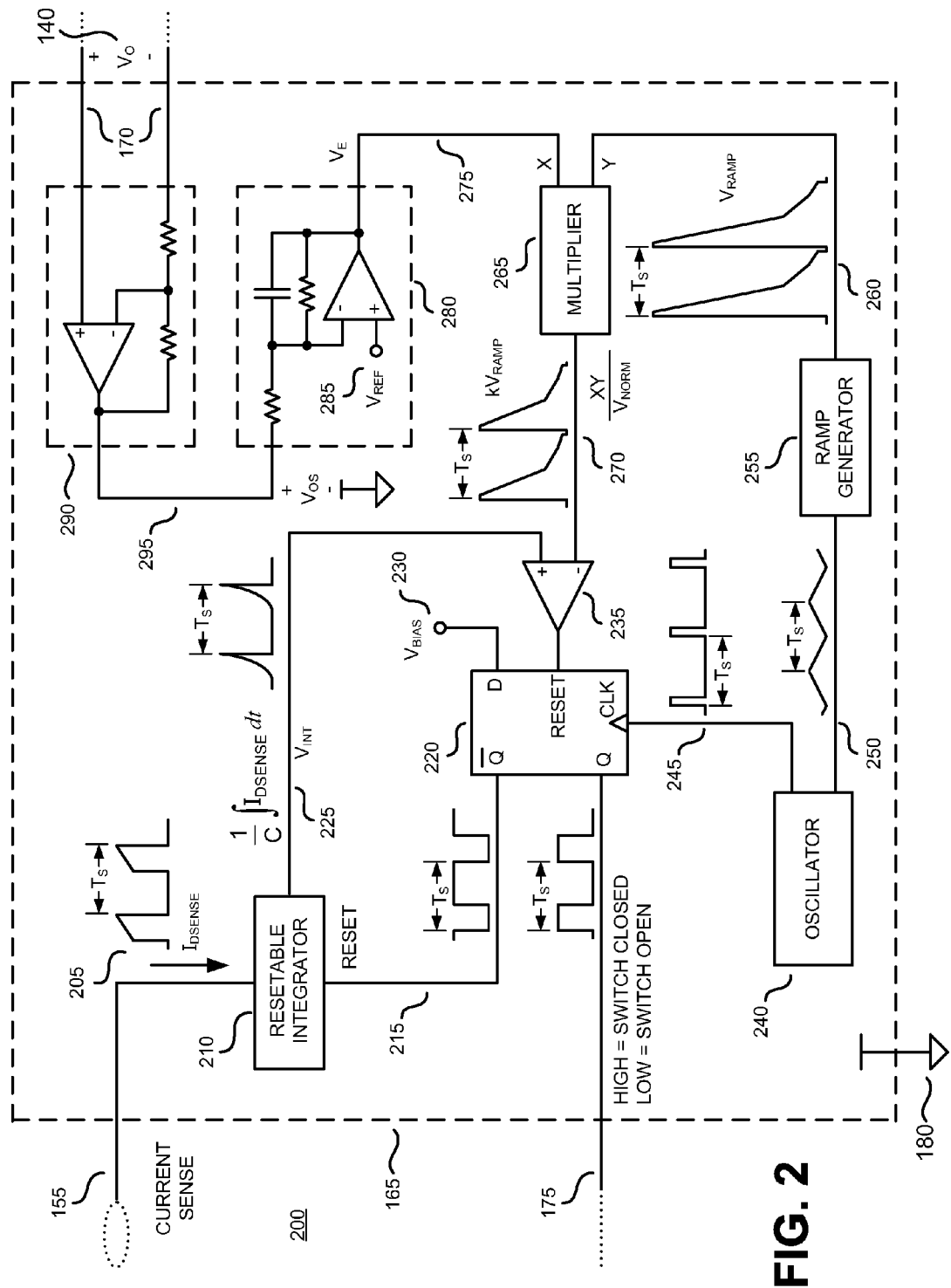
FIG. 2 illustrates an example controller of the power supply of FIG. 1 in greater detail in accordance with the teachings of the present invention.

FIG. 2 is functional block diagram 200 that shows one example of controller 165 of the example power supply of FIG. 1 in greater detail in accordance with the teachings of the present invention. As shown, a sensed switch current $I_{DSENSE}$ 205 may be received by a resetable integrator 210. In the example, the resetable integrator 210 is one that can be initialized upon receipt of a reset signal. Resetable integrator 210 integrates the sensed current $I_{DSENSE}$ 205 to produce a first input signal, which may also be referred to as an integrated current signal 225, during a time when the switch S1 160 is closed. In the example, an open switch does not conduct current. A closed switch may conduct current. In one example, resetable integrator 210 is reset to an initial state of zero when the switch S1 160 is open. In the example of FIG. 2, the integrated current signal 225 is a voltage $V_{INT}$.

In the example of FIG. 2, a differential amplifier 290 receives the output voltage $V_O$ 140 at the voltage sense terminals 170. The differential amplifier 290 scales a magnitude of the output voltage $V_O$ 140 to produce an output sense voltage $V_{OS}$ 295 that is proportional to the output voltage $V_O$ 140 and is referenced to the common input return 180.

An error signal is a signal that represents a difference between an actual value and a desired value. Both the actual value and the desired value are proportional to a reference value. In the example of FIG. 2, an error amplifier 280 is coupled to receive an output sense voltage from differential amplifier 290 that is proportional to the output voltage of the power supply. The error amplifier 280 then produces an error signal 275 that is an amplified difference between the output sense voltage $V_{OS}$ 295 and a reference voltage $V_{REF}$ 285. In the example of FIG. 2, the error signal 275 is an error voltage $V_E$. The reference voltage $V_{REF}$ 285 is proportional to the desired value of the output voltage $V_O$ 140. The error amplifier 280 in FIG. 2 includes a low pass filter that reduces an amplification of high frequency signals. In the example of FIG. 2, the reduction in amplification affects frequencies that are higher than a fraction of the frequency of the AC input voltage $V_{AC}$ 105 of FIG. 1. Thus, the error signal 275 $V_E$ represents substantially an amplified difference between the actual value and the desired value of the output voltage $V_O$ 140 averaged over a time period of several cycles of the AC input voltage $V_{AC}$ 105 of FIG. 1.

In the example shown, an oscillator circuit 240 provides signals and timing information for switching the switch S1 160. A clock signal 245 from the oscillator circuit 240 determines a switching period $T_S$ of the switching cycles. The switching period $T_S$ of a switching cycle is typically much smaller than a period of one cycle of the voltage at the AC input 105. In one example, the switching period $T_S$ of a switching cycle is approximately 16 microseconds, whereas the period of a cycle of the voltage at the AC input 105 is approximately 16 milliseconds. Therefore, in one example, the switch switches approximately 1000 times during one cycle of the voltage at the AC input 105.

In the example of FIG. 2, the oscillator circuit 240 produces a signal 250 with the same switching period $T_S$ as the clock signal 245. A ramp generator or a ramp generator circuit 255 receives the signal 250 to produce a ramp signal 260 that is a voltage $V_{RAMP}$ with substantially the same switching period $T_S$ as the clock signal 245, according to the example. The features of the ramp signal 260 will be discussed later in this disclosure. In the example of FIG. 2, the ramp generator circuit 255 constructs the ramp signal 260 from portions of the signal 250. In another example, a different ramp generator circuit may construct the ramp signal 260 from only the clock signal 245.

In the example shown, a multiplier circuit 265 receives the error signal 275 as the error voltage $V_E$ and the ramp signal 260 as a voltage $V_{RAMP}$. The multiplier circuit 265 produces a scaled ramp signal 270 that is a product of the error signal 275 $V_E$ and the ramp signal 260 $V_{RAMP}$ divided by a normalizing voltage $V_{NORM}$. Therefore, in the example of FIG. 2, an output of the multiplier circuit 265 is a voltage $kV_{RAMP}$ that is proportional to the ramp signal 260. The scaled ramp signal 270 is thus responsive to both the ramp signal 260 $V_{RAMP}$ and the error signal 275 $V_E$.

In the example shown, a comparator 235 receives a first input signal, which is illustrated in FIG. 2 as integrated current signal 225 $V_{INT}$, and a second input signal, which is illustrated in FIG. 2 as voltage $kV_{RAMP}$ of scaled ramp signal 270. In FIG. 2, an output of comparator 235 goes to a high logic level when the voltage of integrated current signal 225 $V_{INT}$ exceeds the voltage $kV_{RAMP}$ of the scaled ramp signal 270.

In the example of FIG. 2, a drive signal generator, which may also be referred to as flip flop 220, is configured as a latch to receive the clock signal 245 at its clock input, a bias voltage $V_{BIAS}$ 230 as a high logic level at its D input, and the output of the comparator 235 at its reset input. The output Q of the flip-flop 220 is the drive signal 175 of the switch S1 160. In the example shown, the switch S1 160 is closed when the drive signal 175 is a high logic level. The switch S1 160 is open when the drive signal 175 is a low logic level.

Thus, in the example shown, the flip flop 220 is coupled to receive an input generated in response to both the integrated current signal 225 and the scaled ramp signal 220 to produce a drive signal 175 to be coupled to control a switch S1 160 to substantially regulate an output voltage $V_O$ 140 of the power supply.

The resetable integrator 210 receives a complementary output 215 of the flip-flop 220 at its reset input. Therefore, the resetable integrator 210 is reset when the switch S1 160 is open.

Figure 3:
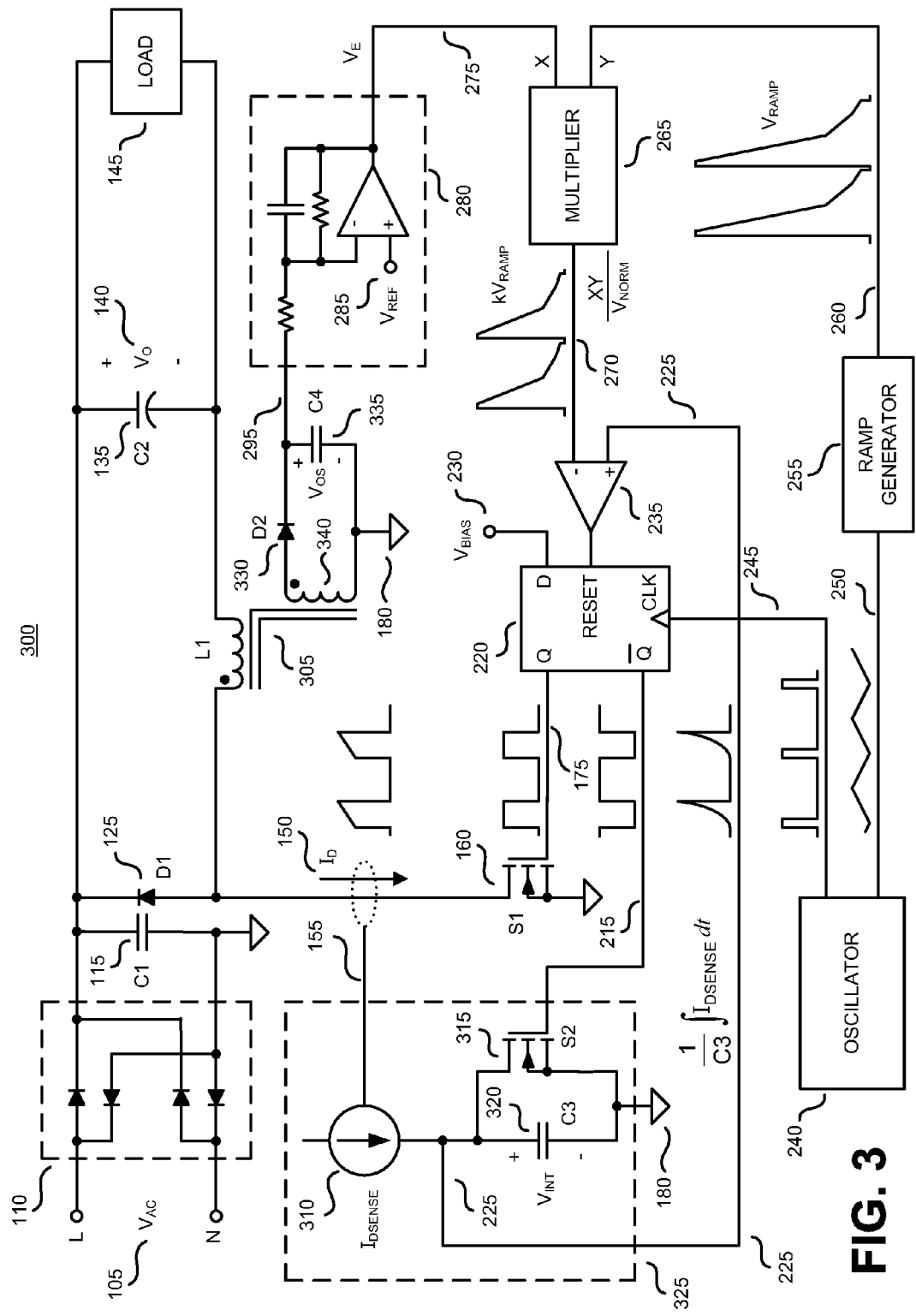
FIG. 3 illustrates another example of an AC-to-DC power supply that includes details of elements of a controller in accordance with the teachings of the present invention.

Next, FIG. 3 shows another example of an AC-to-DC power supply 300 with another example of the controller 165 in accordance with the teachings of the present invention. In the AC-to-DC power supply 300 example of FIG. 3, the output voltage $V_O$ 140 is sensed without the differential amplifier 290 of FIG. 2. The AC-to-DC power supply of FIG. 3 uses a sense winding 340 on a coupled inductor 305 to sense the output voltage $V_O$ 140. According to the example shown, a diode D2 330 rectifies the voltage that appears on the sense winding 340 such that a capacitor C4 335 charges to an output sense voltage $V_{OS}$ 295 referenced to the common input return 180, proportional to the output voltage $V_O$ 140.

In the example of FIG. 3, the current sense signal 155 is received by a resetable integrator 325. The resetable integrator 325 includes a current source 310 of a magnitude $I_{DSENSE}$ that is proportional to the switch current $I_D$ 150. The current source 310 charges a capacitor C3 320 to produce the integrated current signal 225 that is the voltage $V_{INT}$. A switch S2 315 resets the integrated current signal 225 to zero when the signal 215 at the complementary output of the flip-flop 220 goes high. In the example of FIG. 3, switches S1 160 and S2 315 are MOSFETs.

Figure 4:
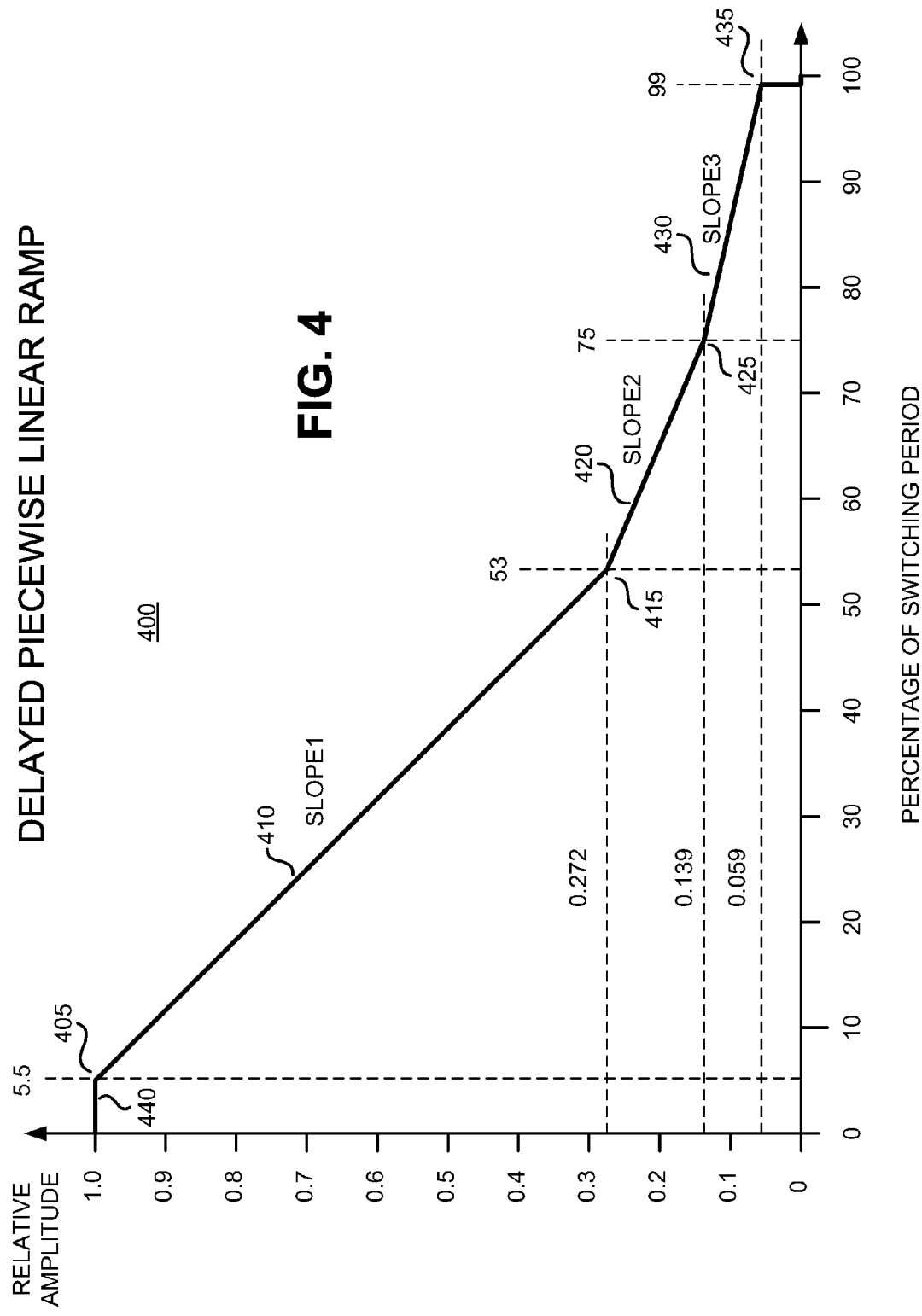
FIG. 4 gives example salient features of a delayed piecewise linear ramp with values for one example in accordance with the teachings of the present invention.

FIG. 4 is a graph 400 that shows features of one example of the ramp signal 260 in accordance with the teachings of the present invention. A vertical axis of the graph 400 shows a relative amplitude of the ramp signal 260 with a maximum amplitude normalized to a value of one. A horizontal axis of the graph 400 shows the time after a beginning of a switching period as a percentage of a total switching period. Zero percent corresponds to a beginning of a period, and 100 percent corresponds to an end of a period.

As shown in the depicted example, ramp signal 260 consists of pieces that are substantially straight lines. Therefore, the example ramp signal 260 in graph 400 is piecewise linear. Each straight line in the example ramp signal 260 in graph 400 is a segment. A segment that is neither horizontal (zero slope) nor vertical (infinite slope) has a finite linear slope in the graph 400. The segments of the ramp signal 260 that have finite linear slopes follow a horizontal segment 440 that has a slope of zero at a maximum amplitude of the ramp signal 260. The horizontal segment 440 constitutes a delay between a start of a switching period and a first segment that has a finite linear slope. Therefore, the ramp signal 260 is referred to as a delayed piecewise linear ramp.

Each piece of the piecewise linear ramp signal 260 with a finite slope is a segment of the ramp. The example of FIG. 4 shows a delayed piecewise linear ramp with three segments that have finite linear slopes: SLOPE1 410, SLOPE2 420, and SLOPE3 430. In other examples, the ramp signal 260 may have either more than three segments with finite linear slopes or fewer than three segments with finite linear slopes.

The graph 400 shows that the example ramp signal 260 begins at its maximum value and maintains the maximum value until it begins to decrease in value at a point 405. The point 405 marks an end of a delay that in one example occurs when approximately 5.5 percent of a switching period has elapsed. After the delay at point 405, the ramp signal 260 decreases in amplitude at a linear slope SLOPE1 410 until it reaches a point 415 that is approximately 0.272 times the maximum amplitude at approximately 53 percent of the switching period. From a point 415, the ramp signal 260 decreases in amplitude at a linear slope SLOPE2 420 until it reaches a point 425 that is approximately 0.139 times the maximum amplitude at approximately 75 percent of the switching period. From the point 425, the ramp signal 260 decreases in amplitude at a linear slope SLOPE3 430 until it reaches a point 435 that is approximately 0.059 times the maximum amplitude at approximately 99 percent of the switching period. It is appreciated that in other examples the values of magnitude and time at the points 405, 415, 425, and 435 may be different from the values in the example of FIG. 4 to achieve desired characteristics of an AC-DC power supply for a particular application.

Figure 5:
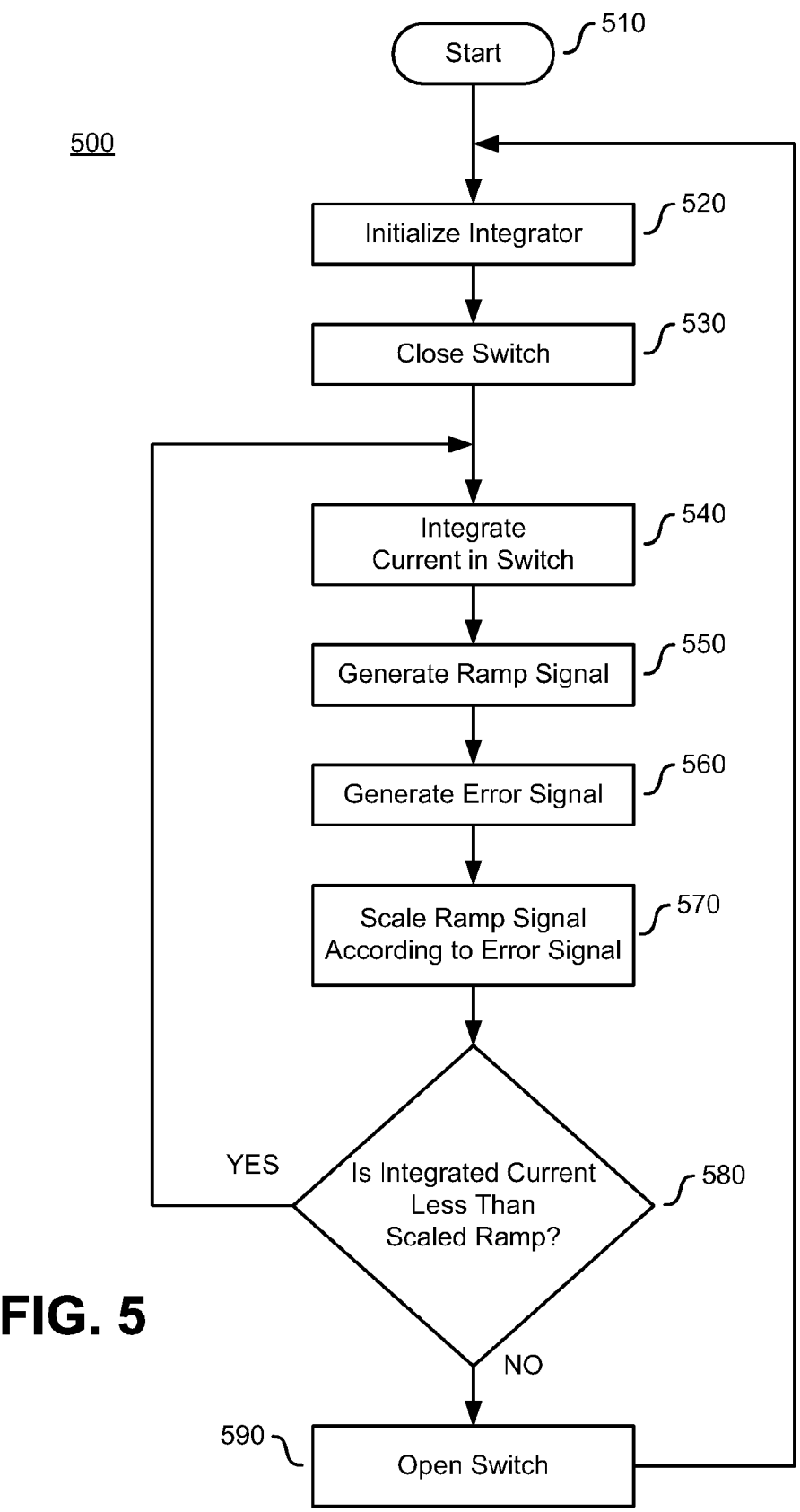
FIG. 5 is a flow diagram that shows an example method in accordance with the teachings of the present invention.

Finally, FIG. 5 shows a flow diagram 500 that illustrates an example method in accordance with the teachings of the present invention. After starting in a block 510, an integrator is initialized in a block 520. A power switch then closes in a block 530. Next, in the example, an integrator integrates current in a power switch in a block 540. A ramp signal is generated in a block 550. Next, an error signal is generated in a block 560 from a sensed output voltage and a reference. In a block 570, an amplitude of the ramp signal is scaled according the error signal. An amplitude of an integrated current signal is compared to an amplitude of a scaled ramp signal in a decision block 580. If the integrated current signal is less than the scaled ramp signal, the integration continues in block 540. If the integrated current signal is not less than the scaled ramp signal, the switch opens in block 590. The integrator is again initialized in block 520, and the flow repeats.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A controller for use in a buck converter, comprising:
   an integrator to be coupled to receive a current sense signal representative of a current in a switch of the buck converter, the integrator to integrate the current sense signal to produce a first input signal;
   a ramp generator coupled to receive an oscillating signal having a same switching period as the switch, the ramp generator to generate a piecewise linear ramp signal in response to the oscillating signal, the piecewise linear ramp signal having a delay segment of substantially zero slope followed by a plurality of segments having finite linear slopes within the switching period of the switch;
   a multiplier to multiply the piecewise linear ramp signal to produce a second input signal; and
   a drive signal generator coupled to receive a third input signal generated in response to the first and the second input signals to produce a drive signal to be coupled to control the switch to substantially regulate an output voltage of the buck converter.

2. The controller of claim 1 wherein the delay segment is substantially at a maximum amplitude of the piecewise linear ramp signal from approximately a beginning of the switching period until approximately 5.5 percent of the switching period has elapsed.

3. The controller of claim 1 wherein the delay segment is followed by approximately three segments having finite linear slopes within the switching period.

4. The controller of claim 1 wherein a first segment starts at approximately a maximum amplitude of the piecewise linear ramp signal and ends at approximately 0.272 times the substantially maximum amplitude of the piecewise linear ramp signal.

5. The controller of claim 1 wherein a second segment starts at approximately an end of a first segment and ends at approximately 0.139 times the substantially maximum amplitude of the piecewise linear ramp signal.

6. The controller of claim 1 wherein a third segment starts at approximately an end of a second segment and ends at approximately 0.059 times the maximum amplitude of the piecewise linear ramp signal.

7. The controller of claim 1 wherein a first segment starts at an approximate end of the delay segment and ends when approximately 53 percent of the switching period has passed.

8. The controller of claim 1 wherein a second segment starts at an approximate end of a first segment and ends when approximately 75 percent of the switching period has passed.

9. The controller of claim 1 wherein a third segment starts at an approximate end of a second segment and ends when approximately 99 percent of the switching period has passed.

10. The controller of claim 1 wherein the switch is included in a same integrated circuit as the controller.

11. The controller of claim 1 wherein the switch is a low-side switch of the buck converter.

12. The controller of claim 1 wherein the buck converter includes transformer isolation.

13. The controller of claim 1 wherein the multiplier is coupled to multiply the piecewise linear ramp signal and an error signal representative of an error in the output voltage of the buck converter to generate a scaled ramp signal.

14. The controller of claim 13 wherein the buck converter includes a sense winding on a coupled inductor to sense an output sense voltage used to produce the error signal.

15. The controller of claim 1 further comprising an oscillator coupled to generate the oscillating signal coupled to be received by the ramp generator and a clock signal coupled to be received by the drive signal generator.

16. A method of controlling a buck converter, comprising:
integrating a signal representative of a current in a switch of the buck converter to produce an integrated current signal;
multiplying a piecewise linear ramp signal and an error signal that is generated in response to an output voltage of the buck converter to generate a scaled ramp signal, wherein the piecewise linear ramp signal includes a delay segment having a substantially zero slope followed by a plurality of segments having finite linear slopes within a switching period of the switch; and
comparing the scaled ramp signal with the integrated current signal to produce a drive signal to control the switch to substantially regulate the output voltage of the buck converter.

17. The method of claim 16 wherein the piecewise linear ramp signal includes a delay segment that is substantially at a maximum amplitude of the piecewise linear ramp signal from approximately a beginning of the switching period until approximately 5.5 percent of the switching period has elapsed.

18. The method of claim 16 wherein the piecewise linear ramp signal includes a first segment that begins after approximately 5.5 percent of the switching period has elapsed.

19. The method of claim 16 wherein the piecewise linear ramp signal includes a second segment that begins after approximately 53 percent of the switching period has elapsed.

20. The method of claim 16 wherein the piecewise linear ramp includes a third segment that begins after approximately 75 percent of the switching period has elapsed.

* * * * *